US010495325B2

(12) United States Patent
Okada et al.

(10) Patent No.: US 10,495,325 B2
(45) Date of Patent: Dec. 3, 2019

(54) HEAT PUMP

(71) Applicant: Yanmar Co., Ltd., Osaka-shi, Osaka (JP)

(72) Inventors: Hideshi Okada, Osaka (JP); Norihiro Okuda, Osaka (JP); Tomoya Yoshimura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 111 days.

(21) Appl. No.: 15/528,009

(22) PCT Filed: Nov. 18, 2015

(86) PCT No.: PCT/JP2015/082459
§ 371 (c)(1),
(2) Date: May 18, 2017

(87) PCT Pub. No.: WO2016/080465
PCT Pub. Date: May 26, 2016

(65) Prior Publication Data
US 2017/0328581 A1 Nov. 16, 2017

(30) Foreign Application Priority Data
Nov. 21, 2014 (JP) .................. 2014-237145

(51) Int. Cl.
*F24F 1/16* (2011.01)
*F25B 43/02* (2006.01)
(Continued)

(52) U.S. Cl.
CPC ............. *F24F 1/16* (2013.01); *F02M 21/023* (2013.01); *F24F 1/10* (2013.01); *F25B 13/00* (2013.01);
(Continued)

(58) Field of Classification Search
CPC ..... F24F 1/16; F24F 1/10; F25B 13/00; F25B 2313/0253; F02M 21/023
See application file for complete search history.

(56) References Cited

U.S. PATENT DOCUMENTS 5,361,595 A * 11/1994 Shimura ................. F24F 3/065
62/175
6,941,767 B2 * 9/2005 Matsuoka ............ F25B 31/004
62/470
(Continued)

FOREIGN PATENT DOCUMENTS

| CN | 1563862 A | 1/2005 |
|---|---|---|
| CN | 103635762 A | 3/2014 |

(Continued)

OTHER PUBLICATIONS

International Preliminary Report on Patentability (PCT/IB/338 & PCT/IB/373) issued in PCT Application No. PCT/JP2015/082459 dated Jun. 1, 2017, including English translation of document C2 (Japanese-language Written Opinion (PCT/ISA/237)) previously filed on May 18, 2017 (7 pages).

(Continued)

*Primary Examiner* — Nelson J Nieves
(74) *Attorney, Agent, or Firm* — Norton Rose Fulbright US LLP

(57) ABSTRACT

An outdoor unit of the heat pump includes a compressor, an oil separator provided in a discharge path of the compressor, an outdoor-unit connecting pipe connecting an intake path of the compressor and an outdoor unit of an another heat pump for supplying a refrigerant to the outdoor unit of the another heat pump, an oil supply pipe extending from a predetermined position of the oil separator and connecting to the outdoor-unit connecting pipe, an on-off valve provided on the oil supply pipe, an expansion valve provided in a portion of the outdoor-unit connecting pipe between a connecting (Continued)

part connected to the intake path and a connecting part connected to the oil supply pipe, and a refrigerant filling port provided in a portion of the outdoor-unit connecting pipe between the connecting part and the expansion valve.

9 Claims, 2 Drawing Sheets

(51) Int. Cl.
    *F25B 45/00*     (2006.01)
    *F02M 21/02*     (2006.01)
    *F24F 1/10*     (2011.01)
    *F25B 13/00*     (2006.01)
    *F25B 31/00*     (2006.01)
    *F04B 39/02*     (2006.01)

(52) U.S. Cl.
    CPC ............ *F25B 31/004* (2013.01); *F25B 43/02* (2013.01); *F25B 45/00* (2013.01); *F04B 39/0207* (2013.01); *F25B 2313/006* (2013.01); *F25B 2313/0233* (2013.01); *F25B 2313/0253* (2013.01); *Y02T 10/32* (2013.01)

(56) References Cited

U.S. PATENT DOCUMENTS

| | | | | |
|---|---|---|---|---|
| 2003/0230107 A1* | 12/2003 | Lee | ......................... | F25B 13/00 62/324.6 |
| 2005/0103045 A1* | 5/2005 | Matsuoka | ............... | F25B 13/00 62/498 |
| 2006/0117770 A1* | 6/2006 | Park | ......................... | F25B 13/00 62/175 |
| 2009/0272135 A1* | 11/2009 | Nishimura | .............. | F25B 13/00 62/149 |
| 2011/0048054 A1* | 3/2011 | Sekine | ..................... | F25B 13/00 62/324.6 |
| 2011/0162746 A1* | 7/2011 | Zhai | ....................... | F25B 31/004 138/26 |
| 2013/0081417 A1* | 4/2013 | Tamura | ................... | F25B 13/00 62/160 |
| 2014/0238069 A1* | 8/2014 | Hayashi | .................. | F25B 13/00 62/470 |
| 2015/0219372 A1* | 8/2015 | Jeong | ...................... | F25B 30/02 62/323.1 |
| 2016/0265821 A1* | 9/2016 | Kimura | ................... | F25B 13/00 |

FOREIGN PATENT DOCUMENTS

| | | |
|---|---|---|
| EP | 1890093 A2 | 2/2008 |
| EP | 2068101 A1 | 6/2009 |
| EP | 2623899 A2 | 8/2013 |
| JP | 2003-193974 A | 7/2003 |
| JP | 2008-249230 A | 10/2008 |
| JP | 4764850 B2 | 9/2011 |
| JP | 2011-202860 A | 10/2011 |
| JP | 2011-247443 A | 12/2011 |

OTHER PUBLICATIONS

International Search Report (PCT/ISA/210) issued in PCT Application No. PCT/JP2015/082459 dated Feb. 16, 2016 with English translation (three pages).
Japanese-language Written Opinion (PCT/ISA/237) issued in PCT Application No. PCT/JP2015/082459 dated Feb. 16, 2016 (four pages).
Korean Office Action dated Jan. 18, 2019 issued in corresponding KR Application 10-2017-7013690.
Office Action dated Jan. 3, 2019 for CN Application No. 201580055148.8.

* cited by examiner

HEAT PUMP

TECHNICAL FIELD

The present invention relates to a heat pump.

BACKGROUND ART

Conventionally known heat pumps include a heat pump having an outdoor unit and an indoor unit configured such that when the heat pump is used as one of a plurality of heat pumps, respective outdoor units of the heat pumps can exchange a refrigerant with indoor units of the plurality of heat pumps (see, e.g., Patent Document 1). In the case of Patent Document 1, outdoor units of a plurality of heat pumps are connected to each other through a connection path, and an on-off valve is provided in the connection path. A refrigerant is exchanged also between the outdoor units through this connecting path and the on-off valve.

PRIOR ART DOCUMENT

Patent Document

Patent Document 1: Japanese Patent No. 4764850

SUMMARY OF THE INVENTION

Problem to be Solved by the Invention

Patent Document 1 does not disclose a refrigerant filling port for filling each heat pump with a refrigerant after a plurality of heat pumps is disposed, for example.

Therefore, a problem to be solved by the present invention is to provide a heat pump having an outdoor unit and an indoor unit configured such that when the heat pump is used as one of a plurality of heat pumps, respective outdoor units of the heat pumps can exchange a refrigerant with indoor units of a plurality of heat pumps, and including a refrigerant filling port.

Means for Solving Problem

To solve the technical problem described above, an aspect of the present invention provides
a heat pump having an outdoor unit,
the outdoor unit including
a compressor,
an oil separator provided in a discharge path of the compressor,
an outdoor-unit connecting pipe connecting an intake path of the compressor and an outdoor unit of an another heat pump for supplying a refrigerant to the outdoor unit of the another heat pump,
an oil supply pipe extending from a predetermined position of the oil separator and connecting to the outdoor-unit connecting pipe,
an on-off valve provided on the oil supply pipe,
an expansion valve provided in a portion of the outdoor-unit connecting pipe between a connecting part connected to the intake path and a connecting part connected to the oil supply pipe, and
a refrigerant filling port provided in a portion of the outdoor-unit connecting pipe between the connecting part connected to the oil supply pipe and the expansion valve.

Another aspect of the present invention provides
a heat pump having an outdoor unit,
the outdoor unit including
a compressor,
an oil separator provided in a discharge path of the compressor,
a refrigerant filling pipe connecting an intake path of the compressor and an outdoor unit of an another heat pump for filling the intake path of the compressor with a refrigerant supplied from the outdoor unit of the another heat pump,
an oil supply pipe extending from a predetermined position of the oil separator and connecting to the refrigerant filling pipe,
an on-off valve provided on the oil supply pipe,
an expansion valve provided in a portion of the refrigerant filling pipe between a connecting part connected to the intake path and a connecting part connected to the oil supply pipe, and
a refrigerant filling port provided in a portion of the refrigerant filling pipe between the connecting part connected to the oil supply pipe and the expansion valve.

Effect of the Invention

The present invention can provide the heat pump having an outdoor unit and an indoor unit configured such that when the heat pump is used as one of a plurality of heat pumps, respective outdoor units of the heat pumps can exchange a refrigerant with indoor units of a plurality of heat pumps, and including the refrigerant filling port.

MODE FOR CARRYING OUT THE INVENTION

An embodiment of the present invention will now be described with reference to the drawings.

Figure 1:
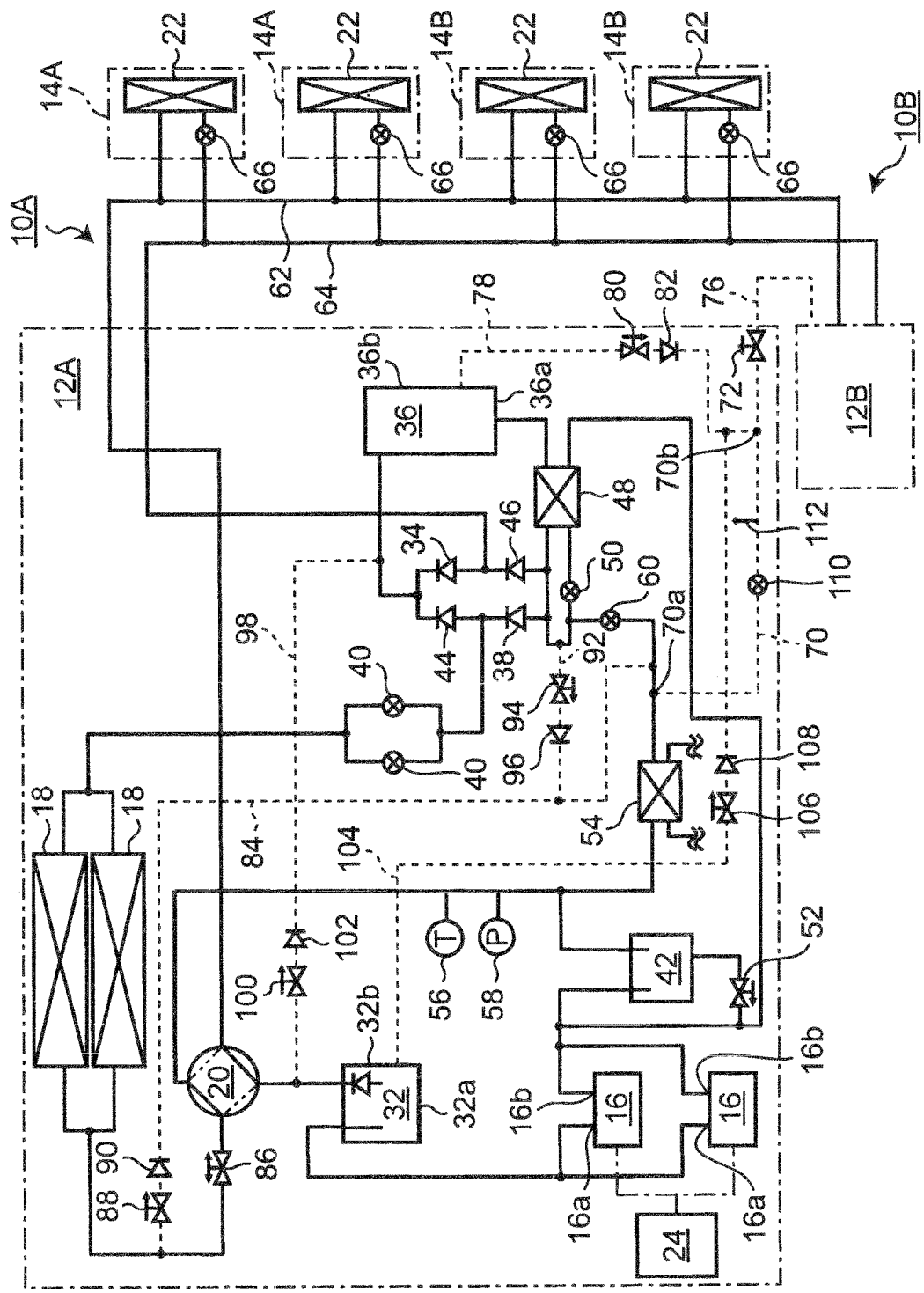
FIG. 1 is a circuit diagram of a configuration of a heat pump according to an embodiment of the present invention.
Figure 2:
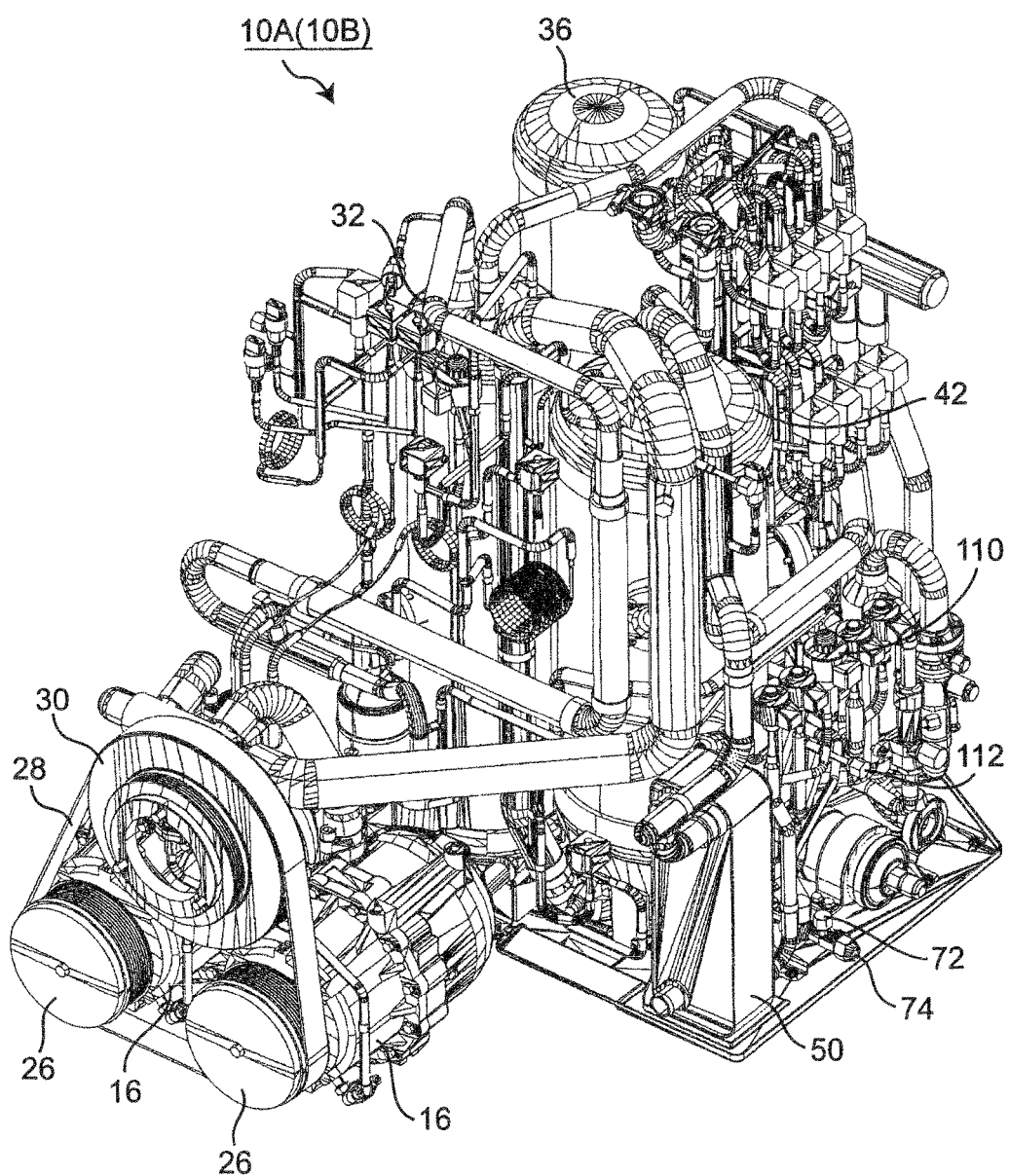
FIG. 2 is a perspective view of a portion of the heat pump according to the embodiment of the present invention.

FIG. 1 is a circuit diagram of a configuration of a heat pump according to an embodiment of the present invention. FIG. 2 is a perspective view of a portion of the heat pump. In the circuit diagram shown in FIG. 1, for simplification of description, constituent elements such as a filter of the heat pump are not shown.

FIG. 1 shows a plurality of heat pumps, or specifically, two heat pumps 10A, 10B each having one outdoor unit 12A, 12B exchanging heat with outside air and two indoor units 14A, 14B exchanging heat with indoor air.

The respective outdoor units 12A, 12B of the heat pumps 10A, 10B are configured to exchange a refrigerant with the indoor units 14A, 14B of the plurality of the heat pumps 10A, 10B as described later in detail.

The plurality of the outdoor units 12A, 12B has substantially the same configuration, and the plurality of the indoor units 14A, 14B has substantially the same configuration. Therefore, in FIG. 1, the outdoor unit 12B is simplified.

The outdoor units 12A, 12B of the heat pumps 10A, 10B each have compressors 16 compressing and discharging a refrigerant, heat exchangers 18 exchanging heat with outside air, and a four-way valve 20. On the other hand, the indoor units 14A, 14B each have a heat exchanger 22 exchanging heat with indoor air.

The compressors 16 are driven by a drive source 24 such as a gas engine, for example. In the present embodiment, the two compressors 16 and the one gas engine 24 are mounted on each of the outdoor units 12A, 12B. As shown in FIG. 2, the compressors 16 are both connected via respective clutches 26 and a belt 28 to a flywheel 30 attached to an output shaft of the gas engine 24. Because of being connected via the clutches 26, at least one of the compressors 16 can selectively be driven by the one gas engine 24.

A high-temperature high-pressure gaseous refrigerant discharged from discharge ports 16a of the compressors 16 is directed by the four-way valve 20 to the heat exchangers 18 of the outdoor units 12A, 12B or the heat exchangers 22 of the indoor units 14A, 14B. In the case of a heating operation, the gaseous refrigerant discharged from the compressors 16 is sent to the heat exchangers 22 of the indoor units 14A, 14B. On the other hand, in the case of a cooling operation, the gaseous refrigerant is sent to the heat exchangers 18 of the outdoor units 12A, 12B.

On a discharge path of the compressors 16, i.e., on a refrigerant path between the discharge ports 16a of the compressors 16 and the four-way valve 20, an oil separator 32 separating a refrigerating machine oil (oil) contained in the refrigerant is provided. It is noted that the oil separated from the refrigerant and stored in a bottom portion 32a of the oil separator 32 is returned through an oil returning path (not shown) to sliding parts in the compressors 16.

In the case of the heating operation, the high-temperature high-pressure gaseous refrigerant discharged from the compressors 16 and passing through the four-way valve 20 (solid line) exchanges heat with indoor air in the heat exchangers 22 of the indoor units 14A, 14B. Therefore, heat is transferred from the refrigerant to the indoor air via the heat exchangers 22. As a result, the refrigerant is put into a low-temperature high-pressure liquid state.

A receiver 36 is provided in each of the outdoor units 12A, 12B. The receiver 36 is a buffer tank temporarily storing the low-temperature high-pressure liquid refrigerant after the heat exchange with indoor air in the heat exchangers 22 of the indoor units 14A, 14B. The liquid refrigerant flowing out from the heat exchangers 22 of the indoor units 14A, 14B passes through a check valve 34 and flows into the receiver 36.

The low-temperature high-pressure liquid refrigerant in the receiver 36 is sent to the heat exchangers 18 of the outdoor units 12A, 12B. A check valve 38 and expansion valves 40 are provided in a path between a bottom portion 36a of the receiver 36 and the heat exchangers 18. The low-temperature high-pressure liquid refrigerant flowing out from the bottom portion 36a of the receiver 36 is expanded by the expansion valves 40 and put into a low-temperature low-pressure liquid state (atomized state).

The low-temperature low-pressure liquid refrigerant passing through the expansion valves 40 exchanges heat with outside air in the heat exchangers 18 of the outdoor units 12A, 12B. Therefore, heat is transferred from the outside air to the refrigerant via the heat exchangers 18. As a result, the refrigerant is put into a low-temperature low-pressure gas state.

The outdoor units 12A, 12B are provided with accumulators 42 temporarily storing the low-temperature low-pressure gaseous refrigerant after the heat exchange with outside air in the heat exchangers 18 of the outdoor units 12A, 12B. The accumulators 42 are each disposed in an intake path of the compressors 16 (the path between intake ports 16b of the compressors 16 and the four-way valve 20).

The low-temperature low-pressure gaseous refrigerant in the accumulator 42 is sucked and compressed in the compressors 16. As a result, the refrigerant is put into a high-temperature high-pressure gas state and is sent toward the heat exchangers 22 of the indoor units 14A, 14B again.

While the low-temperature low-pressure gaseous refrigerant temporarily stays in the accumulator 42, a small amount of liquid refrigerant contained in the gaseous refrigerant is separated. This liquid refrigerant is stored in the accumulator 42.

On the other hand, in the case of the cooling operation, the high-temperature high-pressure gaseous refrigerant discharged from the discharge ports 16a of the compressors 16 moves through the four-way valve 20 (dashed-two dotted line) to the heat exchangers 18 of the outdoor units 12A, 12B. By exchanging heat with outside air in the heat exchangers 18, the refrigerant is put into a low-temperature high-pressure liquid state. The refrigerant flowing out from the heat exchangers 18 passes through the expansion valves 40 and is thereby put into a low-temperature low-pressure liquid state (atomized state). The refrigerant passing through the expansion valves 40 passes through a check valve 44, the receiver 36, and a check valve 46 in order and reaches the heat exchangers 22 of the indoor units 14A, 14B. By exchanging heat with indoor air in the heat exchanger 22, the refrigerant is put into a low-temperature low-pressure gas state. The refrigerant flowing out from the heat exchangers 22 passes through the four-way valve 20 and the accumulator 42 and returns to the compressors 16.

To improve a cooling efficiency, the outdoor units 12A, 12B of the heat pumps 10A, 10B each have a cooling heat exchanger 48 for cooling the refrigerant from the receiver 36 to the check valve 46.

The cooling heat exchanger 48 is configured such that heat is exchanged between the liquid refrigerant from the receiver 36 to the check valve 46 and an atomized refrigerant, i.e., such that the liquid refrigerant is cooled by the atomized refrigerant. This atomized refrigerant is acquired by atomizing a portion of the liquid refrigerant from the cooling heat exchanger 48 to the check valve 46 by an expansion valve 50. The expansion valve 50 is a valve with an adjustable opening degree for allowing the cooling heat exchanger 48 to selectively cool the liquid refrigerant.

When a control device (not shown) of the heat pumps 10A, 10B controls the expansion valve 50 to at least partially open the expansion valve 50, a portion of the liquid refrigerant passing through the cooling heat exchanger 48 before passing through the check valve 46 passes through, and is atomized by, the expansion valve 50. The refrigerant atomized by the expansion valve 50 flows into the cooling heat exchanger 48, draws heat from the liquid refrigerant flowing out from the receiver 36 before passing through the check valve 46, and thereby gasifies. As a result, a liquid refrigerant at a lower temperature flows into the heat exchangers 22 of the indoor units 14A, 14B as compared to when the expansion valve 50 is in the closed state.

On the other hand, the gaseous refrigerant drawing the heat from the liquid refrigerant flowing out from the receiver 36 before passing through the check valve 46 is directly returned from the cooling heat exchanger 48 to the compressors 16. This gaseous refrigerant is also used for evaporating the liquid refrigerant stored in the accumulator 42. In particular, when the on-off valve 52 is opened, the liquid refrigerant in the accumulator 42 is mixed and gasified with the gaseous refrigerant returning from the cooling heat exchanger 48 to the compressor 16 and is returned to the compressor 16.

The heat pumps 10A, 10B each have an assist-evaporation heat exchanger 54 for gasifying a liquid refrigerant contained in the gaseous refrigerant returning from the four-way valve 20 to the compressor 16.

To determine whether the liquid refrigerant is contained in the gaseous refrigerant returning to the compressor 16, a temperature sensor 56 and a pressure sensor 58 for detecting the temperature and the pressure of the refrigerant are provided in the path between the four-way valve 20 and the accumulator 42. The temperature sensor 56 and the pressure sensor 58 output detection signals corresponding to detection results to the control device (not shown) of the heat pumps 10A, 10B. Based on the detection signals from the temperature sensor 56 and the pressure sensor 58, the control device determines whether the liquid refrigerant is contained in the gaseous refrigerant returning to the compressor 16. In particular, if the pressure of the refrigerant detected by the pressure sensor 58 is substantially the same as the vapor pressure corresponding to the temperature detected by the temperature sensor 56, it is determined that the liquid refrigerant is almost not included in the gaseous refrigerant returning to the compressor 16 (the liquid refrigerant is substantially zero).

The assist-evaporation heat exchanger 54 utilizes a portion of the low-temperature high-pressure liquid refrigerant flowing out from the receiver 36 before passing through the check valve 38. Therefore, an expansion valve 60 with an adjustable opening degree is provided between the receiver 36 and the assist-evaporation heat exchanger 54.

When determining that a predefined amount or more of the liquid refrigerant is contained in the gaseous refrigerant returning to the compressor 16, the control device (not shown) of the heat pumps 10A, 10B controls the expansion valve 60. As a result, the expansion valve 60 is at least partially opened.

When the expansion valve 60 is at least partially opened, a portion of the low-temperature high-pressure liquid refrigerant flowing out of the receiver 36 before passing through the check valve 38 flows through the expansion valve 60 and is put into a low-temperature low-pressure atomized state.

The atomized refrigerant passing through the expansion valve 60 is heated in the assist-evaporation heat exchanger 54 by high-temperature exhaust gas or coolant of the gas engine 24, for example. As a result, the atomized refrigerant flowing through the expansion valve 60 into the assist-evaporation heat exchanger 54 is put into a high-temperature low-pressure gas state. The high-temperature gaseous refrigerant heated by the assist-evaporation heat exchanger 54 is put into the path between the four-way valve 20 and the accumulator 42. Therefore, the liquid refrigerant contained in the gaseous refrigerant returning through the four-way valve 20 to the compressor 16 is heated and evaporated (gasified) by the high-temperature gaseous refrigerant from the assist-evaporation heat exchanger 54. As a result, the refrigerant flowing into the accumulator 42 is put into a substantially gaseous state.

Description will be made of heat pump constituent elements utilized when a plurality of heat pumps is used.

First, as shown in FIG. 1, the respective indoor units 14A, 14B of the heat pumps 10A, 10B are connected to common refrigerant pipings 62, 64. The respective outdoor units 12A, 12B of the heat pumps 10A, 10B are also connected to the common refrigerant pipings 62, 64. As a result, at least one of the outdoor units 14A of the heat pump 10A and the outdoor units 14B of the heat pump 10B can exchange the refrigerant with at least one of the indoor units 14A, 14B through the common refrigerant pipings 62, 64.

For example, both the outdoor units 12A, 12B (the compressors 16 thereof) are operated while at least one of the indoor units 14A, 14B is operated in some cases. Each of the indoor units 14A, 14B is provided with an expansion valve 66 with an adjustable opening degree. When the expansion valve 66 is opened, the refrigerant flows into the heat exchanger 22, and each of the indoor units 14A, 14B is operated. Additionally, by adjusting the opening degree of the expansion valve 66, the output of each of the indoor units 14A, 14B is adjusted.

Alternatively, for example, only one of the outdoor units 12A, 12B (the compressors 16 thereof) is operated while at least one of the indoor units 14A, 14B is operated in other cases. Specifically, the total output of at least one of the indoor units 14A, 14B may be satisfied by the output of either one of the outdoor units 12A, 12B. In such a case, either one of the outdoor units 12A, 12B (the compressors 16 thereof) is operated and the other is stopped. This is because it is better to drive only one of the gas engines 24 of the outdoor units 12A, 12B at the rated output and stop the other, as compared to driving both of the gas engines 24 of the outdoor units 12A, 12B at an output lower than the rated output, in terms of fuel consumption, energy efficiency, life span, etc.

However, when only one of the outdoor units 12A, 12B (the compressors 16 thereof) is operated, the refrigerant may become insufficient in the operating outdoor unit. This is because the refrigerant flowing out from the heat exchangers 22 of the indoor units 14A, 14B tends to flow toward the stopped outdoor unit rather than the one operating outdoor unit of the outdoor units 12A, 12B.

If the refrigerant becomes insufficient in either one of the outdoor units 12A, 12B, an oil lubricating the compressors 16 of the operating outdoor unit may accordingly become insufficient. This is because the oil-containing refrigerant discharged from the compressors 16 of the operating outdoor unit flows out from the heat exchangers 22 of the indoor units 14A, 14B and then flows together with the oil to the stopped outdoor unit.

To take a countermeasure, the outdoor unit of the heat pump of the present embodiment is configured such that when the heat pump is used as one of a plurality of heat pumps, the refrigerant and the oil can be supplied from a stopped outdoor unit to an operating outdoor unit.

Description will be made of the case that the outdoor unit 12B is in operation while the outdoor unit 12A is stopped by way of example. It is noted that the following description can be applied by replacing the suffixes "A" and "B" of reference numerals to the case that the outdoor unit 12A is in operation while the outdoor unit 12B is stopped.

As shown in FIG. 1, when the outdoor unit 12B is (the compressors 16 thereof are) in operation, the refrigerant flowing out from the outdoor unit 12B (and the oil contained therein) flows through the common refrigerant piping 62 into the heat exchanger 22 of at least one of the indoor units 14A, 14B. Although a large portion of the refrigerant after heat exchange with indoor air in the heat exchanger 22 flows toward the outdoor unit 12B due to suction by the compressors 16 of the operating outdoor unit 12B, a portion thereof flows toward the stopped outdoor unit 12A. The portion of the refrigerant stays in the stopped outdoor unit 12A. Therefore, a portion of the refrigerant must be supplied from the stopped outdoor unit 12A to the operating outdoor unit 12B.

To supply the refrigerant from the stopped outdoor unit 12A to the operating outdoor unit 12B, the stopped outdoor unit 12A has an outdoor-unit connecting pipe 70 for connecting to the operating outdoor unit 12B.

The outdoor-unit connecting pipe 70 of the stopped outdoor unit 12A connects the intake path of the compressors 16 thereof and the operating outdoor unit 12B. In the case of the present embodiment, one end of the outdoor-unit connecting pipe 70 of the stopped outdoor unit 12A is connected to a path portion that is a portion of the intake path of the compressors 16 (a connecting part 70a) between the assist-evaporation heat exchanger 54 and the expansion valve 60. On the other hand, a manually openable/closable on-off valve 72 is provided in the vicinity of the other end.

As shown in FIG. 2, a connector 74 for connecting to the operating outdoor unit 12B is provided at the other end of the outdoor-unit connecting pipe 70 of the stopped outdoor unit 12A. Specifically, the connector 74 of the outdoor-unit connecting pipe 70 in the stopped outdoor unit 12A is connected through a connecting piping 76 shown in FIG. 1 to the connector 74 of the outdoor-unit connecting pipe 70 in the operating outdoor unit 12B. As a result, the refrigerant can flow from the outdoor-unit connecting pipe 70 in the stopped outdoor unit 12A through the connecting piping 76 toward the outdoor-unit connecting pipe 70 in the operating outdoor unit 12B. Therefore, in the operating outdoor unit 12B, the outdoor-unit connecting pipe 70 functions as a refrigerant filling pipe for filling the intake path of the compressors 16 with the refrigerant supplied from the stopped outdoor unit 12A.

In the stopped outdoor unit 12A, a large portion of the refrigerant is stored in the receiver 36 and the heat exchangers 18. For supplying the refrigerant in the receiver 36 of the stopped outdoor unit 12A to the operating outdoor unit 12B, a first refrigerant supply pipe 78 for directly connecting the receiver 36 and the outdoor-unit connecting pipe 70 is provided in the outdoor unit 12A.

The first refrigerant supply pipe 78 is connected to a side surface 36b of the receiver 36. Specifically, the first refrigerant supply pipe 78 is connected to a position of the side surface 36b of the receiver 36 located at a predetermined height with respect to the bottom portion 36a. As a result, the refrigerant stored in the receiver 36 of the stopped outdoor unit 12A can be supplied through the first refrigerant supply pipe 78 and the outdoor-unit connecting pipe 70 to the operating outdoor unit 12B. A predefined amount of the refrigerant can be left in the receiver 36 in preparation for a future operation of the stopped outdoor unit 12A.

The first refrigerant supply pipe 78 is provided with an on-off valve 80 and a check valve 82. When the outdoor unit 12A is (the compressors 16 thereof are) in operation, the on-off valve 80 is in a closed state. When the outdoor unit 12A is stopped, the check valve 82 prevents a backward flow of the refrigerant through the first refrigerant supply pipe 78 to the receiver 36.

A second refrigerant supply pipe 84 is provided in the outdoor unit 12A so as to supply the refrigerant in the heat exchangers 18 of the stopped outdoor unit 12A to the operating outdoor unit 12B.

One end of the second refrigerant supply pipe 84 is connected to the path between the four-way valve 20 and the heat exchangers 18. Specifically, the path between the four-way valve 20 and the heat exchangers 18 is provided with an on-off valve 86 closed so as to prevent the refrigerant from flowing backward from the heat exchangers 18 to the discharge path (the discharge ports 16a) of the compressors 16 while the compressors 16 are stopped. The one end of the second refrigerant supply pipe 84 is connected between the on-off valve 86 and the heat exchangers 18.

On the other hand, the other end of the second refrigerant supply pipe 84 is connected to the path between the assist-evaporation heat exchanger 54 and the expansion valve 60.

As a result, the refrigerant stored in the heat exchangers 18 of the stopped outdoor unit 12A can be supplied through the second refrigerant supply pipe 84 and the outdoor-unit connecting pipe 70 to the operating outdoor unit 12B.

The second refrigerant supply pipe 84 is provided with an on-off valve 88 and a check valve 90. When the outdoor unit 12A is (the compressors 16 thereof are) in operation, the on-off valve 88 is in a closed state. When the outdoor unit 12A is stopped, the check valve 90 prevents a backward flow of the refrigerant through the second refrigerant supply pipe 84 to the heat exchangers 18.

As described above, a portion of the refrigerant in the receiver 36 and the refrigerant in the heat exchangers 18 of the stopped outdoor unit 12A are supplied through the first and second refrigerant supply pipes 78, 84 and the outdoor-unit connecting pipe 70 to the operating outdoor unit 12B. However, the refrigerant may still become insufficient in the operating outdoor unit 12B.

In this case, the refrigerant is further supplied from the receiver 36 of the stopped outdoor unit 12A to the operating outdoor unit 12B.

Specifically, in the heating operation, the on-off valve 100 of the stopped outdoor unit 12A is opened to draw the discharged refrigerant of the operating outdoor unit 12B to push out the refrigerant staying in the receiver 36 to the check valve 46 and the first refrigerant supply pipe 78. The refrigerant pushed out to the check valve 46 flows through the common refrigerant piping 64 to the operating outdoor unit 12. The refrigerant pushed out to the first refrigerant supply pipe 78 flows via the on-off valve 80 and the check valve 82 from the connecting piping 76 to the outdoor unit 12B. In this case, the opening degree of the expansion valve 110 of the outdoor unit 12B is controlled to adjust the amount of refrigerant flowing from the connecting piping 76.

On the other hand, in the cooling operation, the on-off valve 88 of the stopped outdoor unit 12A is opened so that the refrigerant staying in the heat exchangers 18 is sucked through the check valve 88, the second refrigerant supply pipe 84, the assist-evaporation heat exchanger 54, the four-way valve 20, and the common piping 62 to the operating outdoor unit 12B.

The refrigerant is supplied from the outdoor unit 12A to the operating outdoor unit 12B through the first and second refrigerant supply pipes 78, 84 of the stopped outdoor unit 12A (in some cases, also through the third and fourth refrigerant supply pipes 92, 98). In addition, the oil for lubricating the compressors 16 of the operating outdoor unit 12B is supplied from the stopped outdoor unit 12A.

Therefore, an oil supply pipe 104 extending from a predetermined position of the oil separator and connecting to the outdoor-unit connecting pipe 70 is provided in the outdoor unit 12A.

On the other hand, one end of the oil supply pipe 104 is connected to a portion of the outdoor-unit connecting pipe 70 (a connecting part 70b) between the connecting part 70a connected to the intake path of the compressors 16 and the manual on-off valve 72.

On the other hand, the other end of the oil supply pipe 104 is connected to a predetermined position of the side surface 32b of the oil separator 32 located at a predetermined height with respect to the bottom portion 32a of the oil separator 32. As a result, the oil stored in the oil separator 32 of the stopped outdoor unit 12A can be supplied through the oil supply pipe 104 and the outdoor-unit connecting pipe 70 to the operating outdoor unit 12B. A predefined amount of the oil can be left in the oil separator 32 in preparation for future operation of the stopped outdoor unit 12A (the compressors 16 thereof).

The oil supply pipe 104 of the stopped outdoor unit 12A is provided with an on-off valve 106 and a check valve 108. When the outdoor unit 12A is in operation, the on-off valve 106 is closed. The check valve 108 prevents inflow of the refrigerant from the outdoor-unit connecting pipe 70 into the oil separator 32.

The operating outdoor unit 12B supplied with the refrigerant and the oil from the stopped outdoor unit 12A will hereinafter be described. The configurations of the outdoor units 12A, 12B are substantially the same as described above. Therefore, for understanding of the configuration of the outdoor unit 12B, the configuration of the outdoor unit 12A shown in FIG. 1 can be used.

The refrigerant supplied from the stopped outdoor unit 12A flows into the outdoor-unit connecting pipe 70 (i.e., the refrigerant filling pipe) of the operating outdoor unit 12B. In the operating indoor unit 12B, the on-off valve 80 on the first refrigerant supply pipe 78, the on-off valve 88 on the second refrigerant supply pipe 84, the on-off valve 94 on the third refrigerant supply pipe 92, the on-off valve 100 on the fourth refrigerant supply pipe 98, and the on-off valve 106 of the oil supply pipe 104 are closed. Therefore, the refrigerant flowing into the outdoor-unit connecting pipe 70 of the operating outdoor unit 12B passes through the assist-evaporation heat exchanger 54 and the accumulator 42 in order and enters the intake ports 16b of the compressors 16.

The expansion valve 110 with an adjustable opening degree is provided on the outdoor-unit connecting pipe 70 of the operating outdoor unit 12B. The expansion valve 110 is provided in a portion of the outdoor-unit connecting pipe 70 between the connecting part 70a connected to the intake path of the compressors 16 and the connecting part 70b connected to the oil supply pipe 104. When the refrigerant is exchanged via the outdoor-unit connecting pipe 70 between the stopped outdoor unit 12A and the operating outdoor unit 12B, the expansion valve 110 is opened.

The refrigerant supplied from the stopped outdoor unit 12A and flowing into the outdoor-unit connecting pipe 70 in the operating outdoor unit 12B is atomized by the expansion valve 110. The refrigerant atomized by the expansion valve 110 is heated and gasified by the assist-evaporation heat exchanger 54. As a result, the refrigerant supplied from the stopped outdoor unit 12A can flow into the compressors 16 of the operating outdoor unit 12B in the gas state.

The oil supplied from the stopped outdoor unit 12A accompanies the refrigerant supplied from the outdoor unit 12A and flows into the outdoor-unit connecting pipe 70 (i.e., the refrigerant filling pipe) of the operating outdoor unit 12B in the same way. Therefore, the outdoor-unit connecting pipe 70 (i.e., the refrigerant filling pipe) functions as an oil supply path for supplying not only the refrigerant but also the oil.

The oil flowing into the outdoor-unit connecting pipe 70 of the operating outdoor unit 12B enters the compressors 16 along with the refrigerant and is discharged from the compressors 16 along with the gaseous refrigerant and recovered by the oil separator 32. The oil recovered by the oil separator 32 is through an oil returning circuit (not shown) to the sliding parts of the compressors 16.

When determining that the refrigerant is not sufficient and is in short supply, the control device of the operating outdoor unit 12B transmits a signal requesting the refrigerant to the control device of the stopped outdoor unit 12A. On the other hand, the control device of the stopped outdoor unit 12A receiving the refrigerant request signal opens at least one of the on-off valve 80 on the first refrigerant supply pipe 78, the on-off valve 88 on the second refrigerant supply pipe 84, the on-off valve 94 on the third refrigerant supply pipe 92, the on-off valve 100 on the fourth refrigerant supply pipe 98 and the on-off valve 106 of the oil supply pipe 104 to supply the refrigerant to the operating outdoor unit 12B.

In addition, a refrigerant filling port 112 for filling the refrigerant is provided in the outdoor-unit connecting pipe 70 of the outdoor units 12A, 12B. Specifically, the refrigerant filling port 112 is provided in a portion of the outdoor-unit connecting pipe 70 between the connecting part 70b connected to the oil supply pipe 104 and the expansion valve 110.

For example, after a plurality of the heat pumps 10A, 10B is disposed, or specifically, after a plurality of the outdoor units 12A, 12B and a plurality of the indoor units 14A, 14B are disposed and connected, the refrigerant filling port 112 is used for filling the outdoor units 12A, 12B of the respective heat pumps 10A, 10B with the refrigerant.

When each of the outdoor units 12A, 12B is filled with the refrigerant via the refrigerant filling port 112, an operator closes the manual on-off valve 72 of the outdoor-unit connecting pipe 70. While the respective compressors 16 of the outdoor units 12A, 12B are in operation, the refrigerant is filled via the refrigerant filling port 112. Therefore, the outdoor-unit connecting pipe 70 provided with the refrigerant filling port 112 functions as a path for filling the refrigerant.

Since the manual on-off valve 72 and the refrigerant filling port 112 are provided on the outdoor-unit connecting pipe 70, the manual on-off valve 72 and the refrigerant filling port 112 are close as shown in FIG. 2. As a result, the operator can confirm the closed state of the manual on-off valve 72 before filling the refrigerant via the refrigerant filling port 112 into the outdoor units 12A, 12B.

The refrigerant filled into the outdoor-unit connecting pipe 70 via the refrigerant filling port 112 is atomized by the expansion valve 110 and gasified by the assist-evaporation heat exchanger 54. The gasified refrigerant flows into the compressors 16. The refrigerant is then discharged by the compressors 16 and filled into the entire path.

As described above, according to the present embodiment, the heat pumps 10A, 10B having the outdoor units 12A, 12B and the indoor units 14A, 14B can be provided, and the heat pumps 10A, 10B are configured such that when the heat pumps are used as a plurality of heat pumps, the respective outdoor units 12A, 12B of the heat pumps 10A, 10B can exchange the refrigerant with the indoor units 14A, 14B of a plurality of the heat pumps 10A, 10B, and include the refrigerant filling port 112.

Although the present invention has been described with the embodiment, the present invention is not limited thereto.

For example, although the present invention has been described by using the two heat pumps 10A, 10B in the embodiment, the present invention is not limited to two heat pumps. For example, three or more heat pumps may be included.

In the case of the embodiment, the heat pumps 10A, 10B each have the one outdoor unit 12A, 12B and the two indoor units 14A, 14B; however, the present invention is not limited thereto. Three of more indoor units may be included for one outdoor unit of the heat pump.

Additionally, each of the heat pumps 10A, 10B according to the embodiment can be used alone. In this case, the manual on-off valve 72, the on-off valve 80 on the first refrigerant supply pipe 78, the on-off valve 88 on the second refrigerant supply pipe 84, the on-off valve 94 on the third refrigerant supply pipe 92, the on-off valve 100 on the fourth refrigerant supply pipe 98, and the on-off valve 106 of the oil supply pipe 104 are kept in the closed state.

The heat pump according to the present invention is not limited to the heat pumps 10A, 10B of the embodiment. In a broad sense, the heat pump according to the present invention is a heat pump having an outdoor unit, the outdoor unit including a compressor, an oil separator provided in a discharge path of the compressor, an outdoor-unit connecting pipe connecting an intake path of the compressor and an outdoor unit of an another heat pump for supplying a refrigerant to the outdoor unit of the another heat pump, an oil supply pipe extending from a predetermined position of the oil separator and connecting to the outdoor-unit connecting pipe, an on-off valve provided on the oil supply pipe, an expansion valve provided in a portion of the outdoor-unit connecting pipe between a connecting part connected to the intake path and a connecting part connected to the oil supply pipe, and a refrigerant filling port provided in a portion of the outdoor-unit connecting pipe between the connecting part connected to the oil supply pipe and the expansion valve.

In a broad sense, another heat pump according to the present invention is a heat pump having an outdoor unit, the outdoor unit including a compressor, an oil separator provided in a discharge path of the compressor, a refrigerant filling pipe connecting an intake path of the compressor and an outdoor unit of an another heat pump for filling the intake path of the compressor with a refrigerant supplied from the outdoor unit of the another heat pump, an oil supply pipe extending from a predetermined position of the oil separator and connecting to the refrigerant filling pipe, an on-off valve provided on the oil supply pipe, an expansion valve provided in a portion of the refrigerant filling pipe between a connecting part connected to the intake path and a connecting part connected to the oil supply pipe, and a refrigerant filling port provided in a portion of the refrigerant filling pipe between the connecting part connected to the oil supply pipe and the expansion valve.

The present invention is applicable to a heat pump having an oil separator provided in a discharge path of a compressor.

Although the present invention has been sufficiently described in terms of the preferable embodiment with reference to the accompanying drawings, various variations and modifications are apparent to those skilled in the art. It should be understood that such variations and modifications are included in the present invention without departing from the scope of the present invention according to appended claims.

The disclosures of description, drawings, and claims of Japanese Patent Application No. 2014-237145 filed on Nov. 21, 2014 are incorporated herein by reference in their entirety.

EXPLANATIONS OF LETTERS OR NUMERALS 10A heat pump
10B heat pump
12A outdoor unit
12B outdoor unit
16 compressor
32 oil separator
70 outdoor-unit connecting pipe
70a connecting part
70b connecting part
104 oil supply pipe
106 on-off valve
110 expansion valve
112 refrigerant filling port

The invention claimed is:

1. A heat pump system comprising;
a first heat pump; and
a second heat pump,
wherein the first heat pump includes a first outdoor unit, the first outdoor unit including:
a compressor,
an oil separator provided in a discharge path of the compressor,
an outdoor-unit connecting pipe connecting an intake path of the compressor and a second outdoor unit of the second heat pump for supplying a refrigerant to the second outdoor unit of the second heat pump,
an oil supply pipe extending from a predetermined position of the oil separator to the outdoor-unit connecting pipe,
an on-off valve provided on the oil supply pipe,
a first expansion valve provided in a portion of the outdoor-unit connecting pipe between a first connecting part connected to the intake path and a second connecting part connected to the oil supply pipe, and
a refrigerant filling port provided in a portion of the outdoor-unit connecting pipe between the second connecting part and the first expansion valve.

2. A heat pump system comprising;
a first heat pump; and
a second heat pump,
wherein the first heat pump includes a first outdoor unit and a first indoor unit, the first outdoor unit including:
a compressor,
an oil separator provided in adischargepathofthe compressor,
a refrigerant filling pipe connected to an intake path of the compressor and a second outdoor unit of the second heat pump for filling the intake path of the compressor with a refrigerant supplied from the second outdoor unit of the second heat pump,
an oil supply pipe extending from a predetermined position of the oil separator and connecting to the refrigerant filling pipe,
an on-off valve provided on the oil supply pipe,
an expansion valve provided in a portion of the refrigerant filling pipe between a first connecting part connected to the intake path and a second connecting part connected to the oil supply pipe, and
a refrigerant filling port provided in a portion of the refrigerant filling pipe between the second connecting part connected to the oil supply pipe and the expansion valve.

3. The heat pump system of claim 2, wherein the refrigerant filling pipe is further configured to supply the refrigerant to the second outdoor unit of the second heat pump.

4. The heat pump system of claim 1, wherein the oil supply pipe is configured to provide oil from the oil separator to the second heat pump via the outdoor-unit connecting pipe.

5. The heat pump system of claim 1, wherein the first connecting part is an intersection of the outdoor-unit connecting pipe and the intake path.

6. The heat pump system of claim 5, wherein the second connecting part is an intersection of the outdoor-unit connecting pipe and the oil supply pipe.

7. The heat pump system of claim 6, wherein the first connecting part is disposed between a heat exchanger provided on the intake path and a second expansion valve provided on the intake path.

8. The heat pump system of claim 1, further comprising a connecting pipe that connects the outdoor-unit connecting pipe to the second outdoor unit.

9. The heat pump system of claim 8, further comprising a manual on-off valve provided on the outdoor-unit connecting pipe between the refrigerant filling port and the connecting pipe.

* * * * *